(12) United States Patent
Yoshitake et al.

(10) Patent No.: US 7,737,187 B2
(45) Date of Patent: Jun. 15, 2010

(54) PROCESS FOR PRODUCING INORGANIC OXIDE ORGANOSOL

(75) Inventors: Keiko Yoshitake, Sodegaura (JP); Yoshinari Koyama, Sodegaura (JP); Naohiko Suemura, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 925 days.

(21) Appl. No.: 11/003,393

(22) Filed: Dec. 6, 2004

(65) Prior Publication Data

US 2005/0154124 A1    Jul. 14, 2005

(30) Foreign Application Priority Data

Dec. 19, 2003    (JP)    ............... 2003-423165

(51) Int. Cl.
*B01F 3/12*    (2006.01)
*C01B 33/145*    (2006.01)
*B05D 7/00*    (2006.01)

(52) U.S. Cl. .............. 516/34; 516/33; 516/36; 427/220; 106/490

(58) Field of Classification Search ........... 516/33, 516/34, 36; 427/220; 106/490
See application file for complete search history.

(56) References Cited

U.S. PATENT DOCUMENTS

| | | | |
|---|---|---|---|
| 2,801,185 A | | 7/1957 | Iler |
| 5,013,585 A | * | 5/1991 | Shimizu et al. ............. 427/220 |
| 5,338,353 A | * | 8/1994 | Uchino et al. ............... 106/490 |
| 5,651,921 A | * | 7/1997 | Kaijou .......................... 516/34 |
| 5,718,907 A | * | 2/1998 | Labarre ....................... 424/401 |
| 6,022,919 A | * | 2/2000 | Komoto et al. .............. 524/430 |
| 6,025,455 A | | 2/2000 | Yoshitake et al. |
| 6,376,559 B1 | * | 4/2002 | Komoto et al. ................ 516/34 |
| 6,533,855 B1 | * | 3/2003 | Gaynor et al. ......... 106/287.14 |
| 2003/0035888 A1 | | 2/2003 | Eriyama et al. |

FOREIGN PATENT DOCUMENTS

| | | |
|---|---|---|
| EP | 0 475 132 A1 | 3/1992 |
| EP | 0 881 192 A1 | 12/1998 |
| EP | 0 982 268 A1 | 3/2000 |
| EP | 1 544 257 A2 * | 6/2005 |
| JP | A 57-196717 | 12/1982 |
| JP | A 58-145614 | 8/1983 |
| JP | A 03-187913 | 8/1991 |
| JP | A 11-043319 | 2/1999 |
| JP | A 2001-213617 | 8/2001 |

OTHER PUBLICATIONS

Derwent Abstract on East, week 200612, London: Derwent Publications Ltd., AN 1996-497605, EP 768351 A1 & WO 9634 63, (BASF NOF Coating Corp), abstract.*

* cited by examiner

*Primary Examiner*—Daniel S Metzmaier
(74) *Attorney, Agent, or Firm*—Oliff & Berridge, PLC

(57) ABSTRACT

A process for producing an inorganic oxide organosol that has good dispersibility and low viscosity, has excellent transparency, and shows good compatibility with resin solutions, and includes the steps (A) and (B) of: (A) adding silicon alkoxide having two or more alkoxy groups bonded to a silicon atom or having one or more hydroxy groups bonded to a silicon atom and one or more alkoxy groups bonded to a silicon atom to a hydrophilic inorganic oxide sol containing a hydrophilic solvent having a boiling point (1 atm) of 100° C. or less in an amount of 25 to 100% by weight in a dispersion medium to treat surface of the inorganic oxide particles in the sol; and (B) replacing the dispersion medium of the surface treated inorganic oxide sol obtained in step (A) with a non-alcoholic organic solvent in the presence of a primary alcohol having 3 to 12 carbon atoms.

8 Claims, No Drawings

PROCESS FOR PRODUCING INORGANIC OXIDE ORGANOSOL

BACKGROUND OF THE INVENTION

1. Field of the Art

The present invention relates to a process for producing an inorganic oxide organosol comprising inorganic oxide particles, to silicon atoms on the surface of which primary alkoxy groups with 3 to 12 carbon atoms being bonded, being stably dispersed in a organic solvent.

2. Description of the Related Art

There are proposed processes for producing inorganic oxide organosols (inorganic oxide sols dispersed in organic solvents) as follows:

U.S. Pat. No. 2,801,185 discloses a colloidal silica which can be re-dispersed in an organic solvent, has a mean particle diameter of 5 to 150 nm, hydrophobic by alcohol groups or organosilyl groups chemically bonded to the surface of the silica, and has hydroxy groups on the surface of 10 m² or less per 1 g measured by Methyl Red adsorption method. In the patent, dimethyl dichlorosilane is added to a silica sol containing triethyl phosphate as a dispersion medium, and after the reaction hydrochloric acid, solvent, excess dichlorosilane and the like are distillated off to give a solid that can be dispersed in benzene or chloroform;

JP-A-57-196717 (1982) discloses a silica powder which the surface thereof is esterified and can be dispersed in an organic solvent, and which is obtained by heating a silica sol dispersed in an alcohol with 2 to 18 carbon atoms at a temperature of 170 to 300° C. and then distilling off the alcohol;

JP-A-58-145614 (1983) discloses a silica powder which can be re-dispersed in an organic solvent, and which is obtained by adding a silylating agent to an organosilica sol having a water content of 10% or less, reacting them each other and then distilling off the solvent and in which silyl groups with 1 to 36 carbon atoms are bonded to the surface of colloidal particles in a rate of 1 to 100/10 nm²;

JP-A-3-187913 (1991) discloses a silica powder which the surface thereof is silylated and can be re-dispersed in a solvent, and which is obtained by adding a trimethyl silylating agent to a sol dispersed in methanol obtained by hydrolyzing an alkyl silicate in methanol in an amount of 5 mol % or more of the trimethyl silylating agent based on the silica, reacting them each other, and then distilling off excess trimethyl silylating agent and the solvent for dispersion;

WO 96/34063 discloses a process for producing a sol comprising azeotropically dehydrating water contained in an aqueous inorganic oxide sol by use of an azeotropic solvent with water, and then surface-treating with a silane coupling agent. Further, the publication discloses that the solvent can be replaced with a desired one, if required;

JP-A-11-43319 (1999) discloses a process for producing a silica sol dispersed in a hydrophobic solvent comprising silylating in a mixed solvent of a hydrophilic solvent with a hydrophobic solvent, and then replacing solvent; and JP-A-2001-213617 (2001) discloses a process for producing a hydrophobic colloidal silica comprising adding a hydrolyzable silicon compound having one or more alkyl groups in the molecule to a colloidal silica containing a hydrophilic organic solvent as a main solvent to obtain a treated colloidal silica, and subjecting the treated colloidal silica to solvent replacement with ultra filtration membrane to produce a hydrophobic colloidal silica containing a hydrophobic organic solvent as a main solvent.

It is known a process for making an inorganic oxide sol organophilic by directly reacting an alcohol with hydroxyl group (OH group) on the surface of inorganic oxide particles. However, the process generally requires a reaction at a high temperature. In order to react an alcohol having a low boiling point, it is required to heat in a pressure vessel such as an autoclave. When an alcohol having a high boiling point is reacted, it can be reacted at atmospheric pressure (1 atm). However, it is difficult to produce a sol stably dispersed in an alcohol having a high boiling point before the surface treatment and to delete unreacted alcohol after the reaction.

In addition, inorganic oxides except silica are generally subject to hydrolysis of alkoxy groups, and therefore it is difficult to maintain long-term stability.

It is also carried out a process for introducing silyl groups and alkoxy groups by reacting trialkoxy silane and the like to the surface of inorganic oxide particles. However, methoxy silane or ethoxy silane that is generally used does not afford organophilic properties or dispersion stability adequately, the alkoxy groups are susceptible to hydrolysis, and sols having a long-term stability are not obtained.

When a silicon alkoxide is reacted with an inorganic oxide in an alcohol having a boiling point of 100° C. or more in conventional processes, it is difficult to delete the alcohol, and therefore a large amount of alcohol tends to remain even after solvent replacement with a hydrophobic solvent, and the alcohol is apt to cause adverse effects in the use scene of the sol. Further, the untreated hydrophilic inorganic colloid is difficult to disperse in an alcohol having a high boiling point.

Although a sol to which trialkyl silyl groups such as trimethyl silyl group are bonded has a high shelf stability, only a few kinds of trialkyl silylation agents can be available, and therefore it is difficult to alter surface treating groups. In addition, reactivity with inorganic oxides other than silica is low, and it is difficult to adapt this process. Further, sols obtained by treating with a trialkyl silyl group have problems that they have poor bonding force or poor reactivity with resin binder.

SUMMARY OF THE INVENTION

In order to solve the above-mentioned problems, the present invention provides a process for producing an inorganic oxide organosol, comprising the steps (A) and (B) of:

(A) adding a silicon alkoxide having two or more alkoxy groups bonded to a silicon atom or having one or more hydroxy groups bonded to a silicon atom and one or more alkoxy groups bonded to a silicon atom to a hydrophilic inorganic oxide sol containing a hydrophilic solvent having a boiling point (1 atm) of 100° C. or less in an amount of 25 to 100% by weight in a dispersion medium to treat the surface of inorganic oxide particles in the sol; and (B) replacing the dispersion medium of the surface treated inorganic oxide sol obtained in step (A) with a non-alcoholic organic solvent in the presence of a primary alcohol with 3 to 12 carbon atoms.

The present invention includes the following preferable embodiments:

the processes for producing an inorganic oxide organosol
  wherein the silicon alkoxide in step (A) is a silicon alkoxide having any alkoxy group with 1 to 4 carbon atoms bonded to a silicon atom;

wherein the silicon alkoxide in step (A) is a dialkyl dialkoxy silane or an alkyl trialkoxy silane;

wherein the silicon alkoxide in step (A) is a dialkyl alkoxy hydroxy silane or an alkyl dialkoxy hydroxy silane;

wherein the silicon alkoxide in step (A) is a tetraalkoxy silane or a trialkoxy hydroxy silane;

wherein the silicon alkoxide in step (A) is a silicon alkoxide having any alkyl group with 4 to 20 carbon atoms bonded to a silicon atom;

wherein the non-alcoholic organic solvent in step (B) is a ketone or an ester; and wherein the non-alcoholic organic solvent in step (B) is a hydrocarbon or a halogenated hydrocarbon.

The above-mentioned process can afford an inorganic oxide sol that is dispersed in a non-alcoholic organic solvent (an organic solvent having no alcoholic hydroxyl group) and that is excellent in dispersion stability and long-term shelf stability.

The present invention relates to a process for producing an inorganic oxide organosol comprising inorganic oxide particles, to silicon atoms on the surface of which primary alkoxy groups with 3 to 12 carbon atoms being bonded, being stably dispersed in a organic solvent. In particular, it is appropriate for production of organosols that are dispersed in a hydrophobic organic solvent, for example a ketone such as methyl ethyl ketone (MEK), methyl isobutyl ketone (MIBK), cyclohexanone, etc., an ester such as ethyl acetate, butyl acetate, methyl methacrylate, etc., or a hydrocarbon such as toluene, xylene, etc. and that are excellent in stability.

According to the present invention, there are efficiently produced organosols that contain no by-products impairing characteristics of sols, such as acid or alkaline, etc. and that are excellent in dispersibility. In addition, only a small amount of silicon alkoxide enables stabilization, and it is able to select the kinds of silanes or alcohols depending on the purpose and to control the hydrophobing level.

Further, the organosols produced by the process according to the present invention have good dispersibility and low viscosity, and are excellent in transparency, and further show good compatibility with resin solutions. Therefore, they are particularly useful for microfillers for conferring scratch resistance, adhesion properties, heat resistance, etc. by adding them to coatings or coating binders. Further, as they can utilize alkoxy groups as reaction sites, they can be reacted with resins or the like, and improved in a bonding force.

DESCRIPTION OF THE PREFERRED EMBODIMENTS

Preferable examples of the inorganic oxide sols in the present invention include silica sol, alumina sol, titania sol, zirconia sol, zinc oxide sol, tin oxide sol, antimony oxide sol or iron oxide sol, or composite oxide sol containing them as main components. Colloidal particles as dispersoid may be inorganic oxide particles having a uniform composition or particles covered with inorganic oxides.

More preferably, inorganic oxide sols having hydroxy groups on the surface thereof are mentioned. In addition, the most suitable inorganic oxide sols include silica sols or inorganic oxide sols having silanol groups on the surface thereof by treating with silica, silane or the like.

The hydrophilic solvents in the present invention are solvents that have a boiling point of 100° C. or less at 1 atm, and that can be mixed in an arbitrary ratio with water. Preferable hydrophilic solvents are solvents in which inorganic oxide particles are apt to be dispersed or solvents with a low boiling point which are easy to be removed in the subsequent solvent replacement step. Preferable examples include methanol, ethanol, isopropanol, acetone and a mixed solvent of them. A process for producing an inorganic oxide-sol dispersed in the hydrophilic solvent may be any one of known processes, and includes distillation replacement, ultrafiltration, peptization, dispersion or the like.

The sol dispersed in a hydrophilic solvent may previously contain water used for hydrolysis of silicon alkoxide in step (A), a primary alcohol with 3 to 12 carbon atoms in step (B) or a non-alcoholic organic solvent used for solvent replacement in step (B). However, in case where the amount of the hydrophilic solvent in the mixed solvent is less than 25%, the dispersion stability is impaired, and therefore the amount is not preferable. Further, it is preferable that the amount of water or primary alcohol with 3 to 12 carbon atoms in the sol dispersed in a hydrophilic solvent does not exceed the preferable region mentioned below. The addition amount of them in the subsequent step is an amount corresponding to a shortage that the amount previously contained is deducted from the required amount.

The silicon alkoxide used in step (A) of the present invention is a silicon alkoxide having two or more alkoxy groups bonded to a silicon atom or having one or more hydroxy groups bonded to a silicon atom and one or more alkoxy groups bonded to silicon atom.

The silicon alkoxide having two or more alkoxy groups bonded to a silicon atom includes for example a tetraalkoxy silane, a trialkoxy silane, a dialkoxy silane and an oligomer produced by polymerization of them. Concrete examples include dimethyl dimethoxy silane, methyl trimethoxy silane, tetramethoxy silane, tetrabutoxy silane, ethyl trimethoxy silane, dimethyl diethoxy silane, propyl triethoxy silane, n-butyl trimethoxy silane, n-hexyl trimethoxy silane, n-octyl triethoxy silane, n-octyl methyl diethoxy silane, n-octadecyl trimethoxy silane, phenyl trimethoxy silane, phenyl methyl dimethoxy silane, phenethyl trimethoxy silane, dodecyl trimethoxy silane, n-octadecyl triethoxy silane, phenyl trimethoxy silane, diphenyl dimethoxy silane, vinyl triethoxy silane, γ-methacryl oxypropyl trimethoxy silane, n-decyl trimethoxy silane, dimethoxy diethoxy silane, bis(triethoxysilyl)ethane, hexaethoxy disiloxane and the like. In addition, oligomers produced by condensation of them are mentioned.

The silicon alkoxide having one or more hydroxy groups bonded to a silicon atom and one or more alkoxy groups bonded to a silicon atom includes a hydroxy silane produced by partial hydrolysis of a tetraalkoxy silane, a trialkoxy silane dialkoxy silane, a dialkoxy silane or the like. Concrete examples include dimethyl methoxy hydroxy silane, methyl dimethoxy hydroxy silane, methyl methoxy dihydroxy silane, trimethoxy hydroxy silane, dimethoxy dihydroxy silane, methoxy trihydroxy silane, tributoxy hydroxy silane, dibutoxy dihydroxy silane, butoxy trihydroxy silane, ethyl dimethoxy hydroxy silane, ethyl methoxy dihydroxy silane, dimethyl ethoxy hydroxy silane, propyl diethoxy hydroxy silane, propyl ethoxy dihydroxy silane, n-butyl dimethoxy hydroxy silane, n-butyl methoxy dihydroxy silane, n-hexyl dimethoxy hydroxy silane, n-hexyl methoxy dihydroxy silane, n-octyl diethoxy hydroxy silane, n-octyl ethoxy diethoxy silane, n-octyl methyl diethoxy silane, n-octyl methyl ethoxy hydroxy silane, n-octadecyl dimethoxy hydroxy silane, n-octadecyl methoxy dihydroxy silane, phenyl dimethoxy hydroxy silane, phenyl methoxy dihydroxy silane, phenyl methyl methoxy hydroxy silane, phenethyl dimethoxy hydroxy silane, phenethyl methoxy dihydroxy silane, dodecyl dimethoxy hydroxy silane, dodecyl methoxy hydroxy silane, n-octadecyl diethoxy hydroxy silane, n-octadecyl ethoxy dihydroxy silane, phenyl dimethoxy hydroxy silane, phenyl methoxy dihydroxy silane, diphenyl methoxy hydroxy silane, vinyl diethoxy hydroxy silane, vinyl ethoxy dihydroxy silane, γ-methacryloxypropyl dimethoxy hydroxy silane, γ-methacryloxypropyl methoxy dihydroxy silane, n-decyl dimethoxy hydroxy silane, n-decyl methoxy dihydroxy silane, methoxy diethoxy hydroxy silane, diethoxy dihydroxy silane, dimethoxy ethoxy hydroxy silane, bis(diethoxy hydroxy silyl)ethane, bis(ethoxy dihydroxy silyl)ethane, 1-(diethoxy hydroxy silyl)-2-(triethoxy silyl)ethane, 1-(ethoxydihydroxy silyl)-2-(triethoxy silyl)ethane, 1-(diethoxy hydroxy silyl)-2-(ethoxydihydroxy silyl)ethane, 1,1-diethoxy-1-hydroxysilyl-3,3,3-triethoxy disiloxane, 1-ethoxy-1,1-dihydroxy-3,3,3-triethoxy disiloxane, 1,1-didiethoxy-1-hydroxy-3-ethoxy-3,3-dihydroxy disiloxane and the like. In addition, oligomers produced by condensation of them are mentioned.

These silicon alkoxides can be used alone or in a mixture of two or more.

Among these silicon alkoxides, alkoxides having the number of silicon atom of 2 or less and the number of hydroxy group bonded to the silicon atom of 1 or less per molecule is preferable.

Among the silicon alkoxides having two or more alkoxy groups, a dialkyl dialkoxy silane, an alkyl trialkoxy silane and a tetraalkoxy silane are further preferable, or among silicon alkoxides having one or more hydroxy groups bonded to a silicon atom and one or more alkoxy groups bonded to a silicon atom, a dialkyl alkoxy hydroxy silane, an alkyl dialkoxy hydroxy silane and an trialkoxy hydroxy silane are further preferable.

As characteristics of the surface of the resulting particles are altered depending on the kind of the silicon alkoxide used, it is preferable to select the silicon alkoxide according to the solvent used for dispersing and aimed performance.

When the boiling point of non-alcoholic organic solvent (solvent having no hydroxy group) used for solvent replacement in step (B) is low, it becomes difficult to remove the resulting alcohol. Therefore, silicon alkoxides having alkoxy group with a few carbon atoms such as 1 to 4 carbon atoms are preferable.

When the resulting product is dispersed in hydrocarbon or halogenated hydrocarbon after solvent replacement, it is preferable that the silicon alkoxide has alkyl groups with 4 to 20 carbon atoms bonded to a silicon atom. Preferable alkoxides include for example n-butyl trimethoxy silane, n-hexyl trimethoxy silane, n-octyl triethoxy silane, n-octyl methyl diethoxy silane, octadecyl trimethoxy silane, phenyl trimethoxy silane, phenyl methyl dimethoxy silane, phenethyl trimethoxy silane, dodecyl trimethoxy silane, n-octadecyl triethoxy silane and the like.

Step (A) in which the surface treatment is carried out with the silicon alkoxide is attained by adding the silicon alkoxide to the inorganic oxide sol dispersed in the hydrophilic solvent, contacting them under a weak acidic condition and aging.

When the silicon alkoxide having no hydroxy group bonded to a silicon atom is used in this step, it is required to carry out at the presence of water for hydrolysis.

The pH region for the surface treatment is preferably 2 to 5. The pH can be measured by diluting with the same weight of water in case of a sol dispersed in a hydrophilic organic solvent.

It is preferable that the addition amount of the silicon alkoxide is 2 to 20 μmol per square meter of the surface area of inorganic oxide sol. When the silicon alkoxide is deficient, surface modifying effect is not fully attained. On the other hand, when it is excess, a large amount of alkoxides that are not bonded to the particles remains and therefore it is not preferable.

When silicon alkoxide having no hydroxy group bonded to silicon atom is used, it is required to add water. Water to be added preferably ranges from 0.2 to 6 mol based on 1 mol of silicon alkoxide. Water may be previously contained in inorganic oxide sol or be added after a silicon alkoxide was added to an inorganic oxide sol. When water content is deficient, the surface treatment reaction is hard to occur and silicon alkoxide that are not bonded is apt to remain. On the other hand, water content is excess, the condensation reaction between silicone alkoxides is liable to occur.

The temperature for aging ranges from a normal temperature to a boiling point of a dispersion solvent. The higher the temperature is, the higher the reaction rate is. When the solvent replacement is carried out through distillation, it is able to utilize heat on the distillation.

The primary alcohol with 3 to 12 carbon atoms used in step (B) includes for example n-propyl alcohol, isobutyl alcohol, n-butyl alcohol, n-pentyl alcohol, n-octyl alcohol, ethylene glycol monobutyl ether, propylene glycol monomethyl ether, benzyl alcohol and the like. These alcohols may be used alone or in a mixture of two or more. These alcohols contribute to surface modification of particles by transesterification with the alkoxy groups bonded to silicon atoms on the surface of the inorganic oxide particles as reduction of the hydrophilic solvent having a boiling point of 100° C. or less due to solvent replacement. Therefore, it is preferable to select the kind or amount of the alcohol according to a solvent for dispersing or aimed performance.

As the alcohols with carbon atoms less than 3 have a high hydrophilicity and the alkoxy group is subject to hydrolysis, they do not provide a stable sol. On the other hand, secondary or tertiary alcohols are not suitable because they are difficult to obtain stable alkoxy group. Further, as the alcohols with carbon atoms of 13 or more have a high melting point, they are difficult to be handled, and further they require to be added in a larger amount as they have a high molecular weight.

When the silicon alkoxide having any primary alkoxy group with 3 to 12 carbon atoms is used in step (A), the addition of alcohol for esterification can be omitted or reduced. This is because the transesterification between the silicon alkoxide and an alcohol having a low boiling point as solvent for the sol and the hydrolysis of the silicon alkoxide give primary alcohols with 3 to 12 carbon atoms in the system when the silicon alkoxide is added to the sol.

The addition amount of the primary alcohol with 3 to 12 carbon atoms is at least the same moles based on the total moles of the silicon alkoxide, and preferably is from the same moles to ten times moles based on the estimated moles of [the total moles of alkoxy groups minus the total moles of silicon atoms] of the silicon alkoxide. It is required to add it in an excess amount for loss in the solvent replacement step depending on the kind, boiling point, etc. thereof in mind. Therefore, in case where alcohol having a low boiling point being apt to be distilled off in the solvent replacement step is used, such an alcohol is required to be used in an amount more than a theoretical one. In addition, when any alcohol having a higher boiling point than the non-alcoholic solvent used for replacement is added in an excess amount, the efficiency of solvent replacement is deteriorated, and then the former alcohol is apt to remain in the final sol.

The transesterification of silicon alkoxide is conducted by bringing the silicon alkoxide into contact with an alcohol under a weak acidic condition, replacing alkoxy group and removing at least part of alcohol groups derived from the silicon alkoxide. As the proportion of alkoxy groups in the silicon alkoxide varies depending on the amount or ratio of alcohol in the system, the transesterification proceeds with increase in the rate of the primary alcohol with 3 to 12 carbon atoms in the system by removal of alcohol having a low boiling point. The silicon alkoxide and the primary alcohol with 3 to 12 carbon atoms may be contacted each other before or after hydrolysis of the alkoxide, or after the reaction of the silicon alkoxide with the sol. The methods by which both are come into contact are as follows:

1) A method in which a primary alcohol with 3 to 12 carbon atoms is previously mixed with a silicon alkoxide and the resulting mixture is added to a sol dispersed in a hydrophilic solvent. In this method, non-alcoholic organic solvent may be present;
2) A method in which a silicon alkoxide is added to a sol dispersed in a mixed solvent of a hydrophilic solvent and a primary alcohol with 3 to 12 carbon atoms. Non-alcoholic organic solvent may be contained in the sol;
3) A method in which a silicon alkoxide is added to a sol dispersed in a hydrophilic solvent (a part of the dispersion medium may be non-alcoholic organic solvent), the resulting mixture is subjected to a reaction and then solvent replacement is carried out with a primary alcohol with 3 to 12 carbon atoms and subsequently with non-alcoholic organic solvent;
4) A method in which a silicon alkoxide is added to a sol dispersed in a hydrophilic solvent, the resulting mixture is subjected to a reaction and then a part of the solvent is replaced with non-alcoholic organic solvent, and thereafter solvent replacement is carried out with a primary alcohol with 3 to 12 carbon atoms and subsequently with non-alcoholic organic solvent.

The step by which alcohol derived from silicon alkoxide through transesterification is removed can be carried out by serving as the replacement step with non-alcoholic organic solvent. Generally, it can be attained by distilling to remove alcohol having a low boiling point.

As the transesterification proceeds also during solvent replacement, a primary alcohol with 3 to 12 carbon atoms is required while the alcohol formed from any alcohol having a low boiling point or alkoxide contained in the hydrophilic solvent as raw material remains.

Therefore, it is preferable to add a primary alcohol with 3 to 12 carbon atoms in a slightly excess amount in case where the alcohol is subject to be distilled off.

The non-alcoholic organic solvent used in step (B) of the present invention includes ketones, esters, ethers, hydrocarbons, halogenated hydrocarbons, carboxylic amides and the like. These solvents may be used alone or in a mixed solvents.

Concretely, ketones include methyl ethyl ketone (MEK), diethyl ketone, methyl isobutyl ketone (MIBK), methyl amyl ketone, cyclohexanone, etc.

Esters includes ethyl acetate, butyl acetate, propylene glycol methyl ether acetate, diethylene glycol monoethyl acetate, methyl acrylate, methyl methacrylate, etc.

Ethers include dibutyl ether, dioxane, etc.

Hydrocarbons include n-hexane, cyclohexane, toluene, xylene, sorbent naphtha, etc. Halogenated hydrocarbons include carbon tetrachloride, dichloroethane, chlorobenzene, etc.

Carboxylic amides include DMF, dimethylacetamide, N-methyl pyrrolidone, etc.

EXAMPLES

Hereinafter, examples of the present invention are mentioned. In the meanwhile, the present invention is not limited to these examples.

The methods for measuring the physical properties were as follows:

Average particle diameter (specific surface area diameter)

After drying an organosol, the specific surface area S ($m^2/g$) was measured by using BET method, and the average particle diameter d (nm) was calculated according to conversion equation (1) mentioned below:

$$d \text{ (nm)} = 6000/[\rho \text{ (g/cm}^3) \times S \text{ (m}^2/g)] \quad (1)$$

wherein d is average particle diameter, $\rho$ is a density, and S is specific surface area.

For silica, the density of 2.2 (g/$Cm^3$) was adopted.

Water content

Water content was determined by using Karl Fischer titration method.

Particle diameter based on dynamic light scattering method

A sol was diluted with a dispersion solvent, and measured using the parameter of the solvent with Coulter N4 (trade name: US Coulter, Inc.).

Specific gravity

Specific gravity was measured based on Hydrometer method.

Viscosity

Viscosity was measured by using Ostwald's viscometer.

Solvent composition

Solvent composition was determined based on gas chromatography.

Condition of the gas chromatography:
column: 3 mm×1 m glass column;
packing material: Pola pack Q;
column temperature: 130-230° C. (temperature rising rate 8° C./min.);
carrier: $N_2$ 40 mL/min.;
detector: FID;
injection amount: 1 µL;
internal standard: for toluene sols, acetone was adopted, and for other sols, any internal standard was not used but area ratio was adopted.

Note: each sample was corrected by determining relative sensitivity with a standard mixed solvent.

Example 1

In a glass reactor having an inner volume of 3-liter provided with a stirrer, a condenser, a thermometer and two inlets, 2570 g of a commercially available silica sol dispersed in methanol (trade name: MT-ST, manufactured by Nissan Chemical Industries, Ltd., $SiO_2$ concentration: 30% by weight, average particle diameter: 12 nm, water content: 1.8% by weight, particle diameter based on dynamic light scattering method: 30 nm) was placed, and warmed to 60° C. with an oil bath. After 154 g of phenyl trimethoxy silane (trade name: TSL8173, manufactured by GE Toshiba Silicones Co., Ltd.) was added over 10 minutes, the temperature rose. After distillation started, 255 g of n-butyl alcohol was added while the level of solution was held constant. Further, toluene was added with distillation. When the addition amount of toluene reached 1900 g and the boiling point reached 98° C., solvent replacement was interrupted, and the temperature of solution was maintained at 95° C. for 4 hours. Thereafter, toluene was added again with distillation at atmospheric pressure. The solvent replacement was continued until the addition amount of toluene reached 820 g and the boiling point reached 111° C. while the level of solution was lowered. Consequently, it was obtained 1960 g of silica sol dispersed in toluene ($SiO_2$ concentration: 40% by weight, specific gravity at 20° C.: 1.160, viscosity at 20° C.: 3.6 mPa·s, water content: 0.02% by weight, n-butyl alcohol concentration: 0.5% by weight, particle diameter based on dynamic light scattering method: 31 nm). A part of the sol was sealed in a glass container, and the viscosity thereof was 3.5 mPa·s after being kept in a thermostat at 50° C. for 1 month.

Example 2

Procedures were carried out in a similar manner as those in Example 1 except that isobutyl alcohol was used in place of n-butyl alcohol. Consequently, it was obtained 1960 g of silica sol dispersed in toluene ($SiO_2$ concentration: 40% by weight, specific gravity at 20° C.: 1.160, viscosity at 20° C.: 3.4 mPa·s, water content: 0.02% by weight, isobutyl alcohol concentration: 0.4% by weight, particle diameter based on dynamic light scattering method: 41 nm). A part of the sol was sealed in a glass container, kept in a thermostat at 50° C. for 1 month, and the viscosity thereof was 3.5 mPa·s after being kept in a thermostat at 50° C. for 1 month.

Example 3

Procedures were carried out in a similar manner as those in Example 1 except that 138 g of n-butyl trimethoxy silane (manufactured by Shin-Etsu Chemical Co., Ltd.) was used in place of phenyl trimethoxy silane. Consequently, it was obtained 2600 g of silica sol dispersed in toluene ($SiO_2$ concentration: 30% by weight, specific gravity at 20° C.: 1.065, viscosity at 20° C.: 2.1 mPa·s, water content: 0.02% by weight, n-butyl alcohol concentration: 0.5% by weight, particle diameter based on dynamic light scattering method: 32 nm).

Comparative Example 1

Procedures were carried out in a similar manner as those in Example 1 except that n-butyl alcohol was not added. However, viscosity remarkably increased in the course of the toluene replacement, and aimed silica sol dispersed in toluene was not obtained.

Comparative Example 2

Procedures were carried out in a similar manner as those in Example 1 except that s-butyl alcohol was used in place of n-butyl alcohol. However, viscosity remarkably increased by the toluene replacement after aging at 98° C.

Example 4

In a glass reactor having an inner volume of 3-liter provided with a stirrer, a condenser, a thermometer and two inlets, 2570 g of a commercially available silica sol dispersed in methanol (trade name: MT-ST, manufactured by Nissan Chemical Industries, Ltd., $SiO_2$ concentration: 30% by weight, average particle diameter: 12 nm, water content: 1.8% by weight) was placed, and warmed to 60° C. with an oil bath. While 154 g of phenyl trimethoxy silane (trade name: TSL8173, manufactured by GE Toshiba Silicones Co., Ltd.) was added, distillation was carried out, and further boiling in the reactor was maintained. While the level of solution was held constant, steam of methanol generated in a separate boiler was continuously blown in the silica sol in the reactor until the water content of the sol in the reactor reached 0.3%. Then, while the level of solution was held constant, 255 g of n-butyl alcohol was added with distillation at atmospheric pressure, and further toluene was added. When the addition amount of toluene reached 1911 g and the boiling point reached 98° C., solvent replacement was interrupted, and the temperature of solution was heated at 95° C. for 4 hours. Thereafter, toluene was added again with distillation at atmospheric pressure. The solvent replacement was continued until the addition amount of toluene reached 820 g and the boiling point reached 111° C. while the level of solution was lowered. Consequently, it was obtained 1960 g of silica sol dispersed in toluene ($SiO_2$ concentration: 40% by weight, specific gravity at 20° C.: 1.160, viscosity at 20° C.: 3.1 mPa·s, water content: 0.01% by weight or less, n-butyl alcohol concentration: 0.7% by weight, particle diameter based on dynamic light scattering method: 27 nm). A part of the sol was sealed in a glass container, and the viscosity thereof was 3.2 mPa·s after being kept in a thermostat at 50° C. for 1 month.

Example 5

In a glass reactor having an inner volume of 3-liter provided with a stirrer, a condenser, a thermometer and two inlets, 1400 g of a commercially available silica sol dispersed in methanol (trade name: MT-ST, manufactured by Nissan Chemical Industries, Ltd., $SiO_2$ concentration: 30% by weight, water content: 1.8% by weight, average particle diameter: 12 nm) and 250 g of n-propyl alcohol were placed, and 80 g of methyl trimethoxy silane (trade name: A-163, manufactured by Nippon Unicar Company Limited) was added dropwise over 60 minutes with stirring. Then, the temperature was increased to 55° C. and the aging was carried out for 2 hours at the temperature. Further, after the temperature was increased and distillation started, distillation was continued with addition of propylene glycol monomethyl ether acetate until the temperature of solution reached 78° C. Then, all content solution of the container was transferred to an eggplant-shaped flask, the pressure in the flask was gradually reduced to 70 mmHg, and distillation was continued with addition of propylene glycol monomethyl ether acetate. When total addition amount of propylene glycol monomethyl ether acetate reached 1250 g, solvent replacement was completed. The resulting silica sol dispersed in propylene glycol monomethyl ether acetate had $SiO_2$ concentration of 30% by weight, viscosity at 20° C. of 3.3 mPa·s, and n-propyl alcohol concentration of 0.8% by weight.

Example 6

In the same reactor as that in Example 5, 920 g of a commercially available silica sol dispersed in methanol (trade name: MA-ST-M, manufactured by Nissan Chemical Industries, Ltd., $SiO_2$ concentration: 40% by weight, water content: 2.3% by weight, average particle diameter: 22 nm) was placed, and 103 g of n-butyl silicate (manufactured by Tama Chemical Co., Ltd.) was added dropwise over 10 minutes with stirring. Although white turbidity and increase in viscosity were recognized immediately after dropwise, viscosity and turbidity were decreased after stirring for 45 minutes. Then, the temperature was increased to 50° C. and the aging was carried out for 1 hour at the temperature. Thereafter, the content solution of the container was transferred to a 2-L eggplant-shaped flask, and distillation was carried out at a pressure of 150 mmHg in a rotary evaporator while n-butyl acetate was charged. Further, the pressure was gradually reduced to 70 mmHg, and distillation was continued with addition of butyl acetate. When total addition amount of n-butyl acetate reached 1820 g, solvent replacement was completed. The resulting silica sol dispersed in n-butyl acetate had $SiO_2$ concentration of 30% by weight, viscosity at 20° C. of 3.3 mPa·s, and n-butyl alcohol concentration of 1.2% by weight.

Example 7

In the same reactor as that in Example 5, 850 g of a commercially available silica sol dispersed in methanol (trade name: MA-ST, manufactured by Nissan Chemical Industries, Ltd., $SiO_2$ concentration: 30% by weight, pH 3.3, average particle diameter: 12 nm, water content: 1.8% by weight) and 128 g of n-propyl alcohol were placed, and 64 g of tetra-n-propyl orthosilicate (manufactured by Tokyo Kasei Kogyo Co., Ltd.) was added over 15 minutes with stirring. Then, the temperature was increased to 55° C. and the aging was carried out for 2 hours at the temperature. Thereafter, the temperature was increased until distillation started, and then distillation was carried out with addition of methyl isobutyl ketone (MIBK) while the level of solution was held constant. When the amount of distillate reached 0.4 L, distillation was interrupted. After cooling, the content was transferred to an eggplant-shaped flask, and distillation was carried out at 130 mmHg and a bath temperature of 60-63° C. while MIBK was charged. When total addition amount of MIBK reached 745 g, solvent replacement was completed. The resulting silica sol dispersed in MIBK had specific gravity at 20° C. of 1.119, solid content of 45.0%, viscosity at 20° C. of 2.4 mPa·s, water content of 0.01% by weight, methanol concentration of 0.01% by weight, and n-propyl alcohol concentration of 0.7% by weight.

Example 8

In a 2 L-flask, 815 g of tin oxide-zirconium composite sol covered with tin oxide-tungsten oxide-silicon oxide composite sol (sol dispersed in methanol, total concentration of metal oxides: 32.5% by weight, water content: 0.7% by weight) was placed, and 329 g of n-propyl alcohol was added, then 22.6 g of 10% sulfuric acid was added, and the resulting mixture was stirred with a magnetic stirrer. Then, 36.7 g of methyl trimethoxy silane (trade name: A-163, manufactured by Nippon Unicar Company Limited) was gradually added, and after the completion of the addition, the mixture was subjected to a reaction under reflux for 1 hour. From the resulting sol, methanol was distilled off under a reduced pressure in a rotary evaporator while 4 L of methyl ethyl ketone (MEK) was gradually added at a solution temperature of 30° C. or less. Thereby, it was obtained 1315 g of a sol dispersed in MEK of tin oxide-zirconium composite sol covered with tin oxide-tungsten oxide-silicon oxide in which methanol of methanol sol was replaced with MEK. The resulting sol had specific gravity at 25° C. of 0.976, viscosity at 25° C. of 2.3 mPa·s, and total concentration of metal oxides of 20.0% by weight.

Example 9

In a 1 L-flask, 120 g of antimony oxide-doped tin oxide sol that the surface thereof was treated with antimony oxide-silicon oxide composite sol (sol dispersed in methanol, total concentration of metal oxides: 20.0% by weight, water content: 0.4% by weight) was placed, and 12 g of n-butyl alcohol was added, then 1.4 g of 10% sulfuric acid was added, and the resulting mixture was stirred with a magnetic stirrer. Then, 4.8 g of methyl trimethoxy silane (trade name: A-163, manufactured by Nippon Unicar Company Limited) was gradually added, and after the completion of the addition, the mixture was subjected to a reaction under reflux for 1 hour. From the resulting sol, methanol was distilled off under a reduced pressure in a rotary evaporator while 1.3 L of MEK was gradually added at a solution temperature of 30° C. or less. Thereby, it was obtained 103 g of a sol dispersed in MEK of antimony oxide-doped tin oxide sol that the surface thereof was treated with tin oxide-silicon oxide composite sol in which methanol of methanol sol was replaced with MEK. The resulting sol had specific gravity at 25° C. of 1.006, viscosity at 25° C. of 1.0 mPa·s, and total concentration of metal oxides of 22.0% by weight.

Example 10

In a 1 L-flask, 66.6 g of antimony oxide-doped tin oxide sol (trade name: CCA-30M, manufactured by Nissan Chemical Industries, Ltd., sol dispersed in methanol, total concentration of metal oxides: 30.0% by weight, water content: 0.7% by weight) was placed, and 34 g of methanol and 12 g of n-butyl alcohol were added, then 1.4 g of 10% sulfuric acid was added, and the resulting mixture was stirred with a magnetic stirrer. Then, 4.8 g of methyl trimethoxy silane (trade name: A-163, manufactured by Nippon Unicar Company Limited) was gradually added, and after the completion of the addition, the mixture was subjected to a reaction under reflux for 1 hour. From the resulting sol, methanol was distilled off under a reduced pressure in a rotary evaporator while 1.8 L of MEK was gradually added at a solution temperature of 30° C. or less. Thereby, it was obtained 100 g of a sol dispersed in MEK of antimony oxide-doped tin oxide sol in which methanol of methanol sol was replaced with MEK. The resulting sol had specific gravity at 25° C. of 0.998, viscosity at 25° C. of 1.0 mPa·s, particle diameter based on dynamic light scattering method of 66 nm, and total concentration of metal oxides of 20.0% by weight.

Example 11

In a glass reactor having an inner volume of 1-liter provided with a stirrer, a condenser, a thermometer and two inlets, 516 g of a commercially available silica sol dispersed in methanol (trade name: MT-ST, manufactured by Nissan Chemical Industries, Ltd., $SiO_2$ concentration: 30% by weight, average particle diameter: 12 nm, water content: 1.8% by weight) was placed, and distillation was carried out, and further boiling in the reactor was maintained. While the level of solution was held constant, steam of methanol generated in a separate boiler was continuously blown in the silica sol in the reactor until the water content of the sol in the reactor reached 0.6%. Then, the temperature was decreased to 60° C., 31.9 g of n-hexyl trimethoxy silane (trade name: TSL8241, manufactured by GE Toshiba Silicones Co., Ltd.)

was added, and the aging was carried out for 3 hours at 60° C. Then, 25.8 g of n-butyl alcohol was added with distillation at atmospheric pressure, and further cyclohexane was added. The solvent replacement was continued until the addition amount of cyclohexane reached 1200 g and the boiling point reached 81° C. while the level of solution was lowered. Consequently, it was obtained 400 g of silica sol dispersed in cyclohexane ($SiO_2$ concentration: 39% by weight, specific gravity at 20° C.: 1.056, viscosity at 20° C.: 3.4 mPa·s, water content: 0.01% by weight or less, n-butyl alcohol concentration: 0.3% by weight). A part of the sol was sealed in a glass container, and the viscosity thereof was 3.5 mPa·s after being kept in a thermostat at 50° C. for 1 month.

What is claimed is:

1. A process for producing an inorganic oxide organosol, comprising:
   (A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
   (B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein the silicon alkoxide in step (A) is
   a dialkyl dialkoxy silane, an alkyl trialkoxy silane, a diphenyl dialkoxy silane or a phenyl trialkoxy silane;
   said alkoxy groups have 1 to 4 carbon atoms bonded to a silicon atom; and
   said alkyl groups have 4 to 20 carbon atoms bonded to a silicon atom.

2. A process for producing an inorganic oxide organosol, comprising:
   (A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
   (B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
   the silicon alkoxide in step (A) is
      a dialkyl dialkoxy silane, an alkyl trialkoxy silane, a diphenyl dialkoxy silane or a phenyl trialkoxy silane;
      said alkoxy groups have 1 to 4 carbon atoms bonded to a silicon atom; and
      said alkyl groups have 4 to 20 carbon atoms bonded to a silicon atom; and
   the non-alcoholic organic solvent in step (B) is a hydrocarbon or a halogenated hydrocarbon.

3. A process for producing an inorganic oxide organosol, comprising:
   (A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
   (B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein the silicon alkoxide in step (A) is
   an alkyl dialkoxy hydroxy silane, or a phenyl dialkoxy hydroxy silane;
   said alkoxy groups have 1 to 4 carbon atoms bonded to a silicon atom; and
   said alkyl groups have 4 to 20 carbon atoms bonded to a silicon atom.

4. A process for producing an inorganic oxide organosol, comprising:
   (A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
   (B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
   the silicon alkoxide in step (A) is
      an alkyl dialkoxy hydroxy silane, or a phenyl dialkoxy hydroxy silane;
      said alkoxy groups have 1 to 4 carbon atoms bonded to a silicon atom; and
      said alkyl groups have 4 to 20 carbon atoms bonded to a silicon atom; and
   the non-alcoholic organic solvent in step (B) is a hydrocarbon or a halogenated hydrocarbon.

5. A process for producing an inorganic oxide organosol, comprising:
   (A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
   (B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
   the primary alcohol with 4 to 12 carbon atoms is used in an amount from the same moles to ten times moles based on the estimated moles of (total moles of alkoxy groups minus total moles of silicon atoms) of the silicon alkoxide; and the silicon alkoxide in step (A) is
a dialkyl dialkoxy silane or an alkyl trialkoxy silane; said alkoxy groups have 1 to 4 carbon atoms bonded to a silicon atom; and said alkyl groups have 4 to 20 carbon atoms bonded to a silicon atom.

6. A process for producing an inorganic oxide organosol, comprising:
(A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
(B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
the primary alcohol with 4 to 12 carbon atoms is used in an amount from the same moles to ten times moles based on the estimated moles of (total moles of alkoxy groups minus total moles of silicon atoms) of the silicon alkoxide;
the silicon alkoxide in step (A) is
a dialkyl dialkoxy silane or an alkyl trialkoxy silane; said alkoxy groups have 1 to 4 carbon atoms bonded to a silicon atom; and said alkyl groups have 4 to 20 carbon atoms bonded to a silicon atom; and
the non-alcoholic organic solvent in step (B) is a hydrocarbon or a halogenated hydrocarbon.

7. A process for producing an inorganic oxide organosol, comprising:
(A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
(B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
the primary alcohol with 4 to 12 carbon atoms is used in an amount from the same moles to ten times moles based on the estimated moles of (total moles of alkoxy groups minus total moles of silicon atoms) of the silicon alkoxide; and
the silicon alkoxide in step (A) is
an alkyl dialkoxy hydroxy silane;
said alkoxy groups have 1 to 4 carbon atoms bonded to a silicon atom; and
said alkyl groups have 4 to 20 carbon atoms bonded to a silicon atom.

8. A process for producing an inorganic oxide organosol, comprising:
(A) adding a silicon alkoxide having two or more alkoxy groups bonded to a silicon atom, to a hydrophilic inorganic oxide sol containing methanol in an amount of 25 to 100% by weight in a dispersion medium to treat a surface of inorganic oxide particles in the sol with the silicon alkoxide; and
(B) replacing the dispersion medium of the surface treated inorganic oxide sol obtained in step (A) by distillation with a non-alcoholic organic solvent in the presence of a primary alcohol with 4 to 12 carbon atoms which is at least one primary alcohol selected from the group consisting of isobutyl alcohol, n-butyl alcohol, n-pentyl alcohol, n-octyl alcohol, ethylene glycol monobutyl ether, propylene glycol monomethyl ether and benzyl alcohol, wherein
the primary alcohol with 4 to 12 carbon atoms is used in an amount from the same moles to ten times moles based on the estimated moles of (total moles of alkoxy groups minus total moles of silicon atoms) of the silicon alkoxide;
the silicon alkoxide in step (A) is
an alkyl dialkoxy hydroxy silane; said alkoxy groups have 1 to 4 carbon atoms bonded to a silicon atom; and said alkyl groups have 4 to 20 carbon atoms bonded to a silicon atom; and
the non-alcoholic organic solvent in step (B) is a hydrocarbon or a halogenated hydrocarbon.

* * * * *